United States Patent
Aoyama et al.

(10) Patent No.: US 10,242,309 B2
(45) Date of Patent: Mar. 26, 2019

(54) INFORMATION RECORDING OBJECT AND READING DEVICE

(71) Applicant: Dai Nippon Printing Co., Ltd., Tokyo (JP)

(72) Inventors: Yuko Aoyama, Tokyo (JP); Toshihisa Yamakawa, Tokyo (JP); Atsuhiro Sabashi, Tokyo (JP); Daiki Katou, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 15/524,019

(22) PCT Filed: Sep. 4, 2015

(86) PCT No.: PCT/JP2015/075192
§ 371 (c)(1),
(2) Date: May 3, 2017

(87) PCT Pub. No.: WO2016/075999
PCT Pub. Date: May 19, 2016

(65) Prior Publication Data
US 2017/0316304 A1    Nov. 2, 2017

(30) Foreign Application Priority Data
Nov. 12, 2014   (JP) .................... 2014-229478

(51) Int. Cl.
*B41M 3/14* (2006.01)
*G06K 7/14* (2006.01)
(Continued)

(52) U.S. Cl.
CPC ............... *G06K 19/10* (2013.01); *B41M 3/14* (2013.01); *B42D 25/26* (2014.10); *B42D 25/30* (2014.10);
(Continued)

(58) Field of Classification Search
CPC ...................................... G06K 19/10
(Continued)

(56) References Cited

U.S. PATENT DOCUMENTS

| 4,935,335 | A | * | 6/1990 | Fotland | G09F 19/14 |
| | | | | | 359/463 |
| 2003/0128865 | A1 | * | 7/2003 | White | B41M 3/02 |
| | | | | | 382/113 |

(Continued)

FOREIGN PATENT DOCUMENTS

| EP | 1389537 A1 | 2/2004 |
| EP | 2296362 A1 | 3/2011 |

(Continued)

OTHER PUBLICATIONS

International Search Report dated Nov. 24, 2015, issued for PCT/JP2015/075192.
Supplementary European Search Report, issued to EP Patent Application No. 15858323.7 dated May 22, 2018.
Office Action dated Aug. 30, 2018 issued for corresponding Chinese Patent Application No. 201580056634.1.

*Primary Examiner* — Allyson N Trail
(74) *Attorney, Agent, or Firm* — Locke Lord LLP

(57) ABSTRACT

Provided are an information recording object and a reading device devised so that embedded information is difficult to guess. The information recording object 30 provided with a combined image comprising an image C1 printed in a lustrous layer 31 and an image C2 formed on the image C1 and printed in a transparent layer 32 is characterized in that: the image C1 and the image C2 are each printed with an ink for which the amount of reflected light differs according to viewing angle; for the combined image, one image is visible depending on the viewing angle; the image C2 is an image in which there is a regularity in feature points in a spatial frequency domain F2; and the image C1 is an image in which the feature points in a spatial frequency domain F1 are disposed at positions that block said regularity.

9 Claims, 12 Drawing Sheets

(51) Int. Cl.
*G06K 19/10* (2006.01)
*G07D 7/20* (2016.01)
*B42D 25/30* (2014.01)
*B42D 25/26* (2014.01)
*B42D 25/378* (2014.01)
*G07D 7/005* (2016.01)
*G06K 19/06* (2006.01)
*B42D 25/342* (2014.01)

(52) U.S. Cl.
CPC ......... *B42D 25/342* (2014.10); *B42D 25/378* (2014.10); *G06K 7/1417* (2013.01); *G06K 7/1443* (2013.01); *G06K 19/06037* (2013.01); *G07D 7/005* (2017.05); *G07D 7/20* (2013.01)

(58) Field of Classification Search
USPC .............. 235/462.09, 435; 382/100; 359/619
See application file for complete search history.

(56) References Cited

U.S. PATENT DOCUMENTS

2013/0114876 A1    5/2013   Rudaz et al.
2015/0220821 A1*   8/2015   Baar .................. G06K 15/1878
                                               358/2.1

FOREIGN PATENT DOCUMENTS

| JP | 2008188973 A | 8/2008 |
| JP | 4604209 B2 | 1/2011 |
| JP | 2013-039726 A | 2/2013 |
| JP | 2013-509010 A | 3/2013 |
| JP | 2013-070220 A | 4/2013 |

\* cited by examiner

FIG. 2A
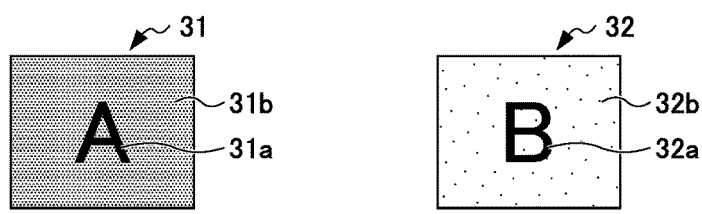
FIG. 2B
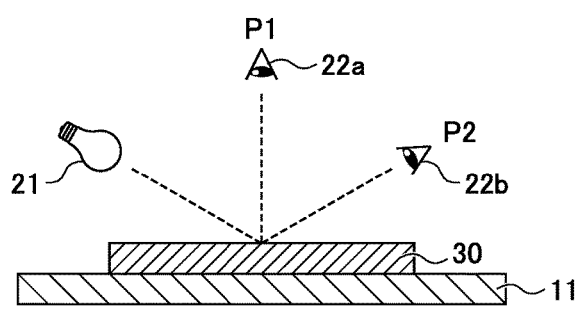
FIG. 2C

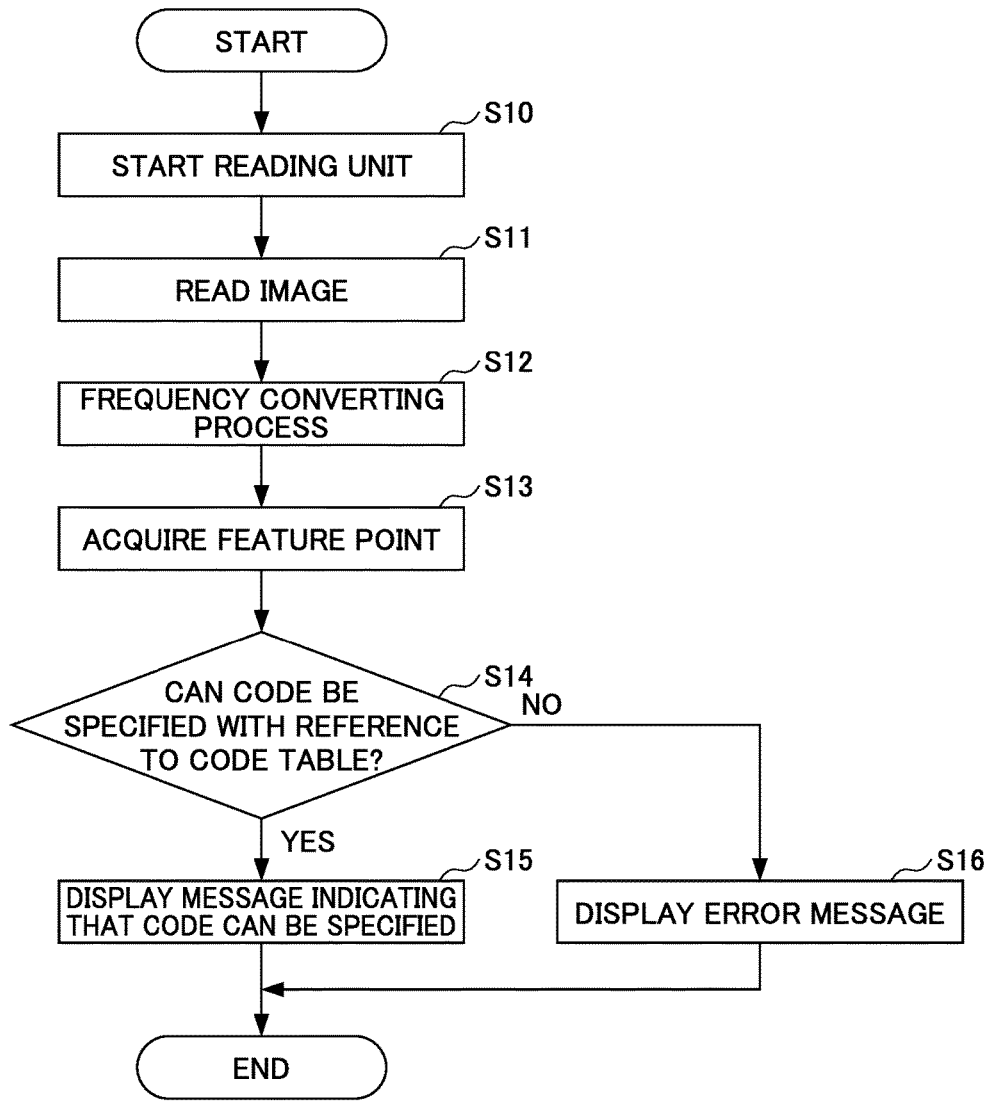

INFORMATION RECORDING OBJECT AND READING DEVICE

TECHNICAL FIELD

The present invention relates to an information recording object and a reading device.

BACKGROUND ART

A digital watermarking technique of embedding specific information in an image or the like is known in the related art. When this technique is used for printed matters, information can be embedded at a level at which the information cannot be visually recognized by a person, and thus artistic effects of printed matter are not damaged. Information embedded in printed matter can be read by a reading device.

As printed matter using the digital watermarking technique, printed matter which includes a plurality of line images having a color element having high brightness and a color element having low brightness, in which the line image including the color element having high brightness has an area from which concentric lines set to extract frequency components corresponding to information to be embedded are disposed and the line image including the color element having low brightness has an area formed by an image group including frequency components other than the frequency components of the concentric lines and forming a shape different from the concentric lines is disclosed (for example, Patent Document 1).

In the printed matter disclosed in Patent Document 1, information is embedded in the line image formed by the color element having high brightness. A shape obtained by frequency-converting the line image of the color element having low brightness and a shape obtained by frequency-converting the line image of the color element having high brightness are different from each other. Since the frequency-converted shapes are different from each other, it is possible to estimate pre-frequency-conversion shapes of the line images.

Patent Document 1: Japanese Unexamined Patent Application, Publication No. 2013-70220

DISCLOSURE OF THE INVENTION

Problems to be Solved by the Invention

However, when embedded information is used for authenticity determination, it is preferable that the embedded information be difficult to estimate from a copy.

An object of the invention is to provide an information recording object and a reading device which are devised to make it difficult to estimate embedded information.

Means for Solving the Problems

The invention achieves the above-mentioned object using the following solving means. According to a first invention, there is provided an information recording object having a combined image including a first image and a second image formed on the first image, in which the first image and the second image are printed with inks having different reflected light intensities depending on a viewing angle, one image of the combined image is recognizable depending on the viewing angle, the second image is an image having regularity in feature points in a spatial frequency domain, and the first image is an image in which feature points in the spatial frequency domain are disposed at positions hindering regularity. A second invention is the information recording object according to the first invention, in which a first shape represented by the feature points in the spatial frequency domain of the first image and a second shape represented by the feature points in the spatial frequency domain of the second image are identical or similar to each other. A third invention is the information recording object according to the second invention, in which the first shape and the second shape are repetitive shapes. A fourth invention is the information recording object according to the first invention, in which the first image and the second image are images in which the feature points in the spatial frequency domain appear at specific positions. A fifth invention is the information recording object according to the fourth invention, in which the feature points in the spatial frequency domain of the second image are disposed on at least one of the feature points in the spatial frequency domain of the first image and points on a line connecting neighbor points of the feature points. A sixth invention is the information recording object according to the first invention, in which the feature points in the spatial frequency domain of the second image correspond to a code. A seventh invention is the information recording object according to the first invention, in which the first image is formed of a color element having low brightness, and the second image is disposed on a viewing side of the first image and is formed of a color element having higher brightness than that of the first image. An eighth invention is the information recording object according to the seventh invention, in which the first image is formed of a lustrous material, and the second image is formed of a transparent material. According to a ninth invention, there is provided a reading device including: a reading unit configured to read an image of the information recording object according to the first invention; a frequency converting unit configured to decompose the image read by the reading unit into frequency components and to convert the frequency components into a spatial frequency domain; and a feature point acquiring unit configured to acquire feature points in the spatial frequency domain converted by the frequency converting unit.

Effects of the Invention

According to the invention, it is possible to provide an information recording object and a reading device which are devised to make it difficult to estimate embedded information.

BRIEF DESCRIPTION OF THE DRAWINGS

FIG. 2 is a diagram illustrating a viewing mode based on a structure of an information recording object according to the embodiment.

FIG. 9 is a flowchart illustrating a code specifying process in the reading device according to the embodiment.

PREFERRED MODE FOR CARRYING OUT THE INVENTION

Hereinafter, an embodiment of the invention will be described with reference to the accompanying drawings. The embodiment is only an example and the technical scope of the invention is not limited to the embodiment.

Embodiment

FIG. 1 is a diagram illustrating printed matter 10 according to an embodiment. FIG. 2 is a diagram illustrating a viewing mode based on a structure of an information recording object 30 according to the embodiment.

<Printed Matter 10>

Figure 1A:
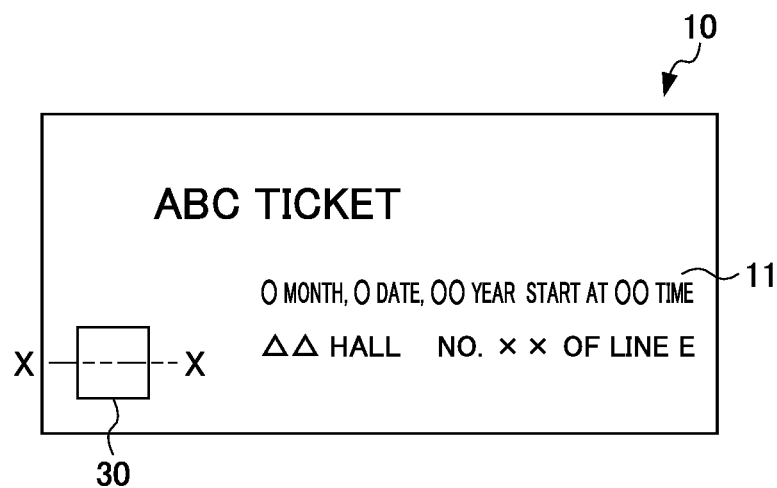
FIG. 1 is a diagram illustrating printed matter according to an embodiment.

Printed matter 10 illustrated in FIG. 1A is, for example, a ticket to a movie or a concert. For example, the printed matter 10 has monetary value in itself, but a copied product of the printed matter 10 does not have monetary value. The printed matter 10 includes a sheet 11 and an information recording object 30. The sheet 11 is a substrate serving as the base of the printed matter 10 and is formed of, for example, a white sheet of paper. The sheet 11 is not limited to the white sheet of paper, but may be another sheet such as a sheet of pure paper, a sheet of coated paper, or a plastic card, as long as it has a plane capable of carrying a printed image. In this example, the printed image relates to details of the ticket.

<Structure of Information Recording Object 30>

Figure 1B:
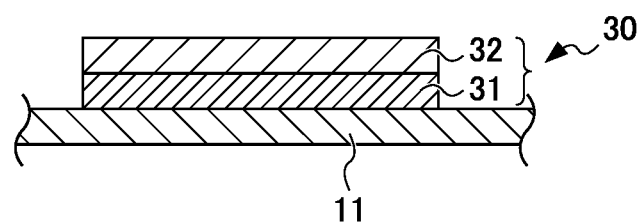

The information recording object 30 is disposed on a surface side of the sheet 11. On the information recording object 30, information which is used for authenticity determination such as a code is printed by latent image printing. An image printed on the information recording object 30 is changed by changing the viewing direction of the sheet 11. Accordingly, the information recording object 30 can provide an effect similar to a hologram. FIG. 1B is a partial schematic cross-sectional view taken along the line X-X in FIG. 1A. As illustrated in FIG. 1B, the information recording object 30 includes a lustrous layer 31 and a transparent layer 32 on the sheet 11. The lustrous layer 31 is a layer in which a pattern image (a first image) is printed with an ink including a lustrous material. The transparent layer 32 is a layer in which a pattern image (a second image) different from the pattern image of the lustrous layer 31 is printed with a transparent ink. The transparent layer 32 is formed on the lustrous layer 31. The information recording object 30 having the above-mentioned configuration can be manufactured, for example, using a method described in Japanese Patent No. 4604209.

A method of manufacturing the information recording object 30 will be described below in brief. First, a sheet 11 on which details of a ticket are printed in advance is prepared, and a pattern image is gravure-printed as a lustrous layer 31 on the sheet 11 with a lustrous ink including a lustrous material. The ink including a lustrous material which is used to draw the pattern image is, for example, an ink including a lustrous material exhibiting a silver color, a blue gold color, or a red gold color and including aluminum powder, copper powder, zinc powder, tin powder, or iron phosphide as a component. Another pattern image is superimposed and gravure-printed as a transparent layer 32 on the pattern image of the lustrous layer 31 with a transparent ink or the like. Examples of the ink which is used to draw the other pattern image include matte OP varnish, transparent varnish, ink varnish, transparent ink, and medium ink. The ink may be any printing ink such as UV-curable ink, an oxidation-polymerization type ink, a permeation type ink, an overheat-drying ink, and a vaporization-drying ink.

The printing of the lustrous layer 31 and the transparent layer 32 in a printing region with a fixed area which is printed through a printing process of the information recording object 30 will be described below in which the printing condition in which an area covering a bed is represented by % is defined as the area ratio, particularly, the printing condition in which the bed is hidden by halftone is defined as the halftone area ratio. FIG. 2A illustrates an example in which image "A" is printed in the lustrous layer 31 and image "B" is printed in the transparent layer 32. In this example, images "A" and "B" instead of pattern images are used for description for the purpose of easy understanding. The lustrous layer 31 includes a foreground portion 31a and a background portion 31b. The foreground portion 31a is image "A" itself and is printed with a halftone area ratio of 100%. The background portion 31b is printed with a halftone area ratio of 75%. Here, the ratios are only an example and are not limited thereto. For example, the halftone area ratio of the foreground portion 31a may be less than 100%, or the halftone area ratio of the background portion 31b may be other than 75%. In this case, it is preferable that a difference in halftone area ratio between the foreground portion 31a and the background portion 31b be equal to or greater than 15% and equal to or less than 50%. The densities of the foreground portion 31a and the background portion 31b may be reversed.

The transparent layer 32 includes a foreground portion 32a and a background portion 32b. The foreground portion 32a is image "B" itself and is printed with a halftone area ratio of 100%. The background portion 32b is printed with a halftone area ratio of 25%. Here, the ratios are only an example and are not limited thereto. For example, the halftone area ratio of the foreground portion 32a may be less than 100%, or the halftone area ratio of the background portion 32b may be equal to or greater than or equal to or less than 25% as long as there is a predetermined difference from the foreground portion 32a. The densities of the foreground portion 32a and the background portion 32b may be reversed. The density difference between the foreground portion 32a and the background portion 32b is greater than the density difference between the foreground portion 31a and the background portion 31b.

The above-mentioned printing process is not limited to gravure printing, but may be wet offset printing, dry offset printing, relief printing, waterless lithography printing, flexographic printing, screen printing, intaglio printing, or the like.

In the information recording object 30 printed in the above-mentioned printing process, a recognizable image varies depending on an angle of a viewpoint (a viewing angle). FIG. 2B illustrates the three positional relationships of an illumination light source 21, a viewpoint 22, and the information recording object 30 in a diffusible reflection region and a regular reflection (specular reflection) region. When the viewpoint 22 (22a) is located at position P1 with respect to the positions of the illumination light source 21 and the information recording object 30, the object is viewed in the diffusible reflection region. When the viewpoint 22 (22b) is located at position P2 with respect to the positions of the illumination light source 21 and the information recording object 30, the object is viewed in the regular reflection region.

In FIG. 2C, when the information recording object 30 includes only the lustrous layer 31, a large difference is caused in reflected light intensity in the diffusible reflection region due to the density difference between the foreground portion 31a and the background portion 31b of image "A" and thus the foreground portion 31a and the background portion 31b can be distinguished. That is, image "A" is visible (#1). In the regular reflection region, since the reflected light intensities of both the foreground portion 31a and the background portion 31b increase, the difference therebetween is not detected and the foreground portion 31a and the background portion 31b cannot be distinguished (#2).

When the information recording object 30 includes only the transparent layer 32, the foreground portion 32a and the background portion 32b are transparent and cannot be distinguished in the diffusible reflection region (#3). In the regular reflection region, since the reflected light intensities of both the foreground portion 32a and the background portion 32b vary due to the density difference therebetween, the foreground portion 32a and the background portion 32b can be distinguished. That is, image "B" is visible (#4). When the transparent layer 32 is formed on the lustrous layer 31 in the information recording object 30, the foreground portion 31a and the background portion 31b can be distinguished but the foreground portion 32a and the background portion 32b cannot be distinguished, in the diffusible reflection region. Accordingly, the foreground portion 31a and the background portion 31b are visible as a whole (#5). In the regular reflection region, the foreground portion 31a and the background portion 31b cannot be distinguished, but the foreground portion 32a and the background portion 32b can be distinguished. Accordingly, the foreground portion 32a and the background portion 32b are visible as a whole (#6).

In this way, by using inks having different reflected light intensities for the lustrous layer 31 and the transparent layer 32 depending on the viewing angle, the image of the lustrous layer 31 and the image of the transparent layer 32 may be visible or invisible depending on the viewing angle and thus can render various presentation modes.

A method of implementing this embodiment using the above-mentioned technique will be described below. FIG. 3 is a diagram illustrating an example of pattern images of the information recording object 30 according to this embodiment. FIGS. 4 to 7 are diagrams illustrating a spatial frequency domain F when a pattern image according to this embodiment is frequency-converted.

EXAMPLE 1

Figure 3A:
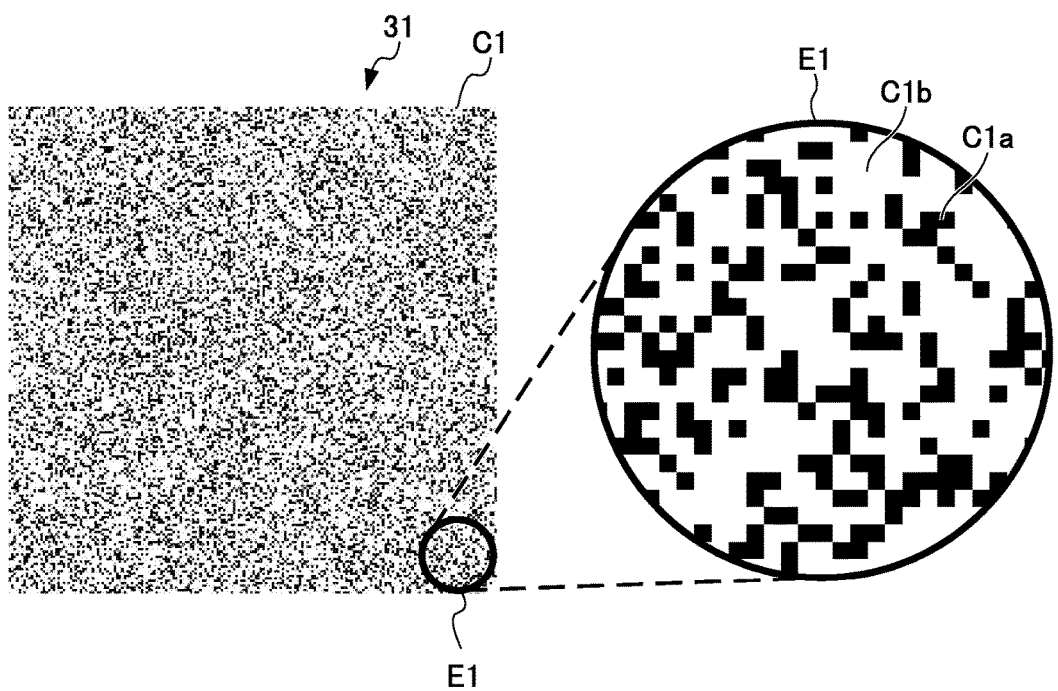
FIG. 3 is a diagram illustrating an example of a pattern image of the information recording object according to the embodiment.
Figure 3B:
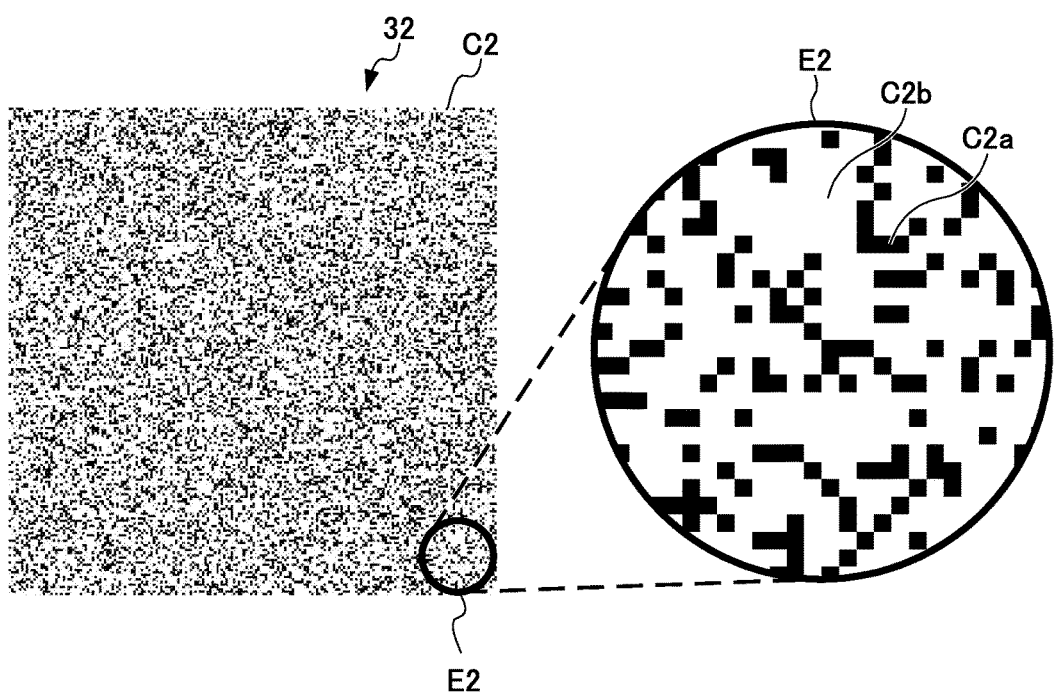

FIG. 3A illustrates image C1 (first image) of the lustrous layer 31 and an enlargement of region E1 which is a part thereof. The lustrous layer 31 is a layer in which image C1 is printed. As illustrated in region E1, image C1 is a pattern image in which a foreground portion C1a and a background portion C1b are expressed in two values. The halftone area ratios of the foreground portion C1a and the background portion C1b are the same as the halftone area ratios of the foreground portion 31a and the background portion 31b described in the example illustrated in FIG. 2. FIG. 3B illustrates image C2 (second image) of the transparent layer 32 and an enlargement of region E2 which is a part thereof. The transparent layer 32 is a layer in which image C2 is printed. As illustrated in region E2, image C2 is a pattern image in which a foreground portion C2a and a background portion C2b are expressed in two values. The halftone area ratios of the foreground portion C2a and the background portion C2b are the same as the halftone area ratios of the foreground portion 32a and the background portion 32b described in the example illustrated in FIG. 2. In this way, since image C1 of the lustrous layer 31 and image C2 of the transparent layer 32 in the information recording object 30 are pattern images, the images are insignificant images when only glanced at by a person.

Figure 4A:
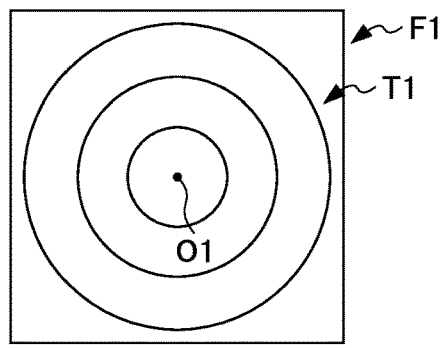
FIG. 4 is a diagram illustrating a spatial frequency domain when a pattern image according to the embodiment is frequency-converted.
Figure 4B:
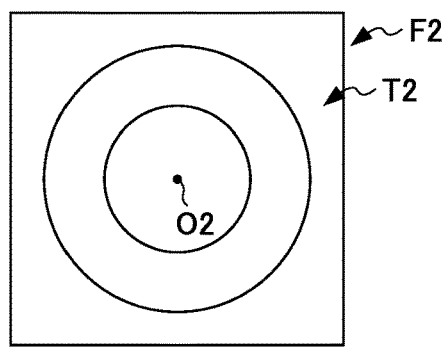

FIG. 4A illustrates a spatial frequency domain F1 frequency-converted by performing Fourier transformation on image C1 of the lustrous layer 31 (see FIG. 3A). In the spatial frequency domain F1, a shape represented by a plurality of feature points presented by frequency-converting image C1 is formed as a repetitive shape T1 (a first shape) which includes a plurality of circles having different radii at an origin O1. FIG. 4B illustrates a spatial frequency domain F2 frequency-converted by performing Fourier transformation on image C2 of the transparent layer 32 (see FIG. 3B). In the spatial frequency domain F2, a shape represented by a plurality of feature points presented by frequency-converting image C2 is formed as a repetitive shape T2 (a second shape) which includes a plurality of circles having different radii at an origin O2. The repetitive shape T2 is interpretable as a code. In this way, the repetitive shape T1 and the repetitive shape T2 are the same circular shape. In this example, the repetitive shape T2 has a larger gap between neighboring circles than that of the repetitive shape T1.

Figure 4C:
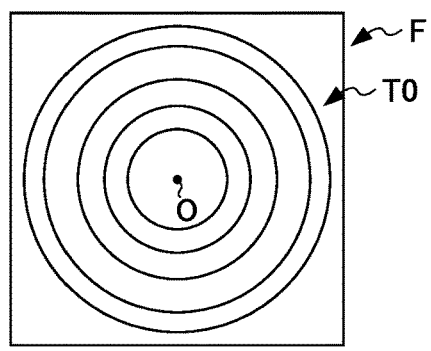

FIG. 4C illustrates a spatial frequency domain F frequency-converted by performing Fourier transformation on a combined image of image C1 of the lustrous layer 31 illustrated in FIG. 3A and image C2 of the transparent layer 32 illustrated in FIG. 3B. A repetitive shape T0 represented in the spatial frequency domain F illustrated in FIG. 4C is a circular shape which includes a plurality of circles having different radii at an origin O and in which the repetitive shape T1 and the repetitive shape T2 are combined. Accordingly, by only viewing the repetitive shape T0, the repetitive shape T1 and the repetitive shape T2 are not distinguished and one thereof cannot be known. As a result, a code indicated by the shape represented by the feature points constituting the repetitive shape T2 cannot be estimated from the spatial frequency domain F.

EXAMPLE 2-1

Figure 5A:
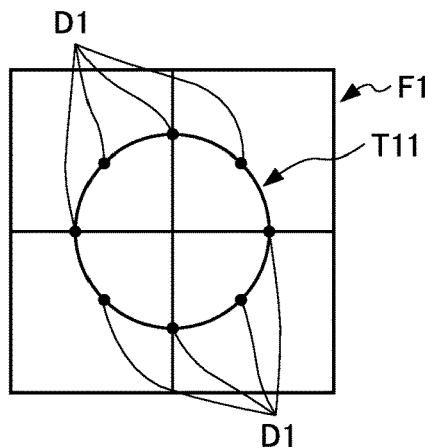
FIG. 5 is a diagram illustrating a spatial frequency domain when a pattern image according to the embodiment is frequency-converted.
Figure 5B:
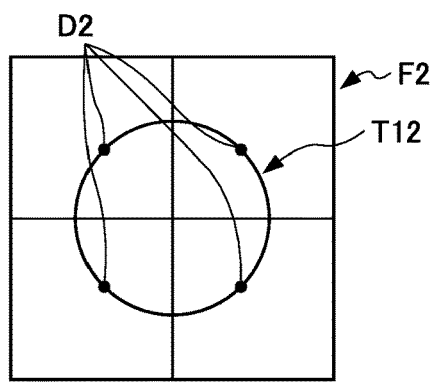

FIG. 5A illustrates a spatial frequency domain F1 frequency-converted by performing Fourier transformation on a certain pattern image of the lustrous layer 31 which is not illustrated. In the spatial frequency domain F1, a shape (a first shape) represented by a plurality of feature points D1 presented by frequency-converting the pattern image of the lustrous layer 31 is formed in a circular shape T11 (specific positions). FIG. 5B illustrates a spatial frequency domain F2 frequency-converted by performing Fourier transformation on another pattern image of the transparent layer 32 which is not illustrated and different from the pattern image of the lustrous layer 31. In the spatial frequency domain F2, a shape (a second shape) represented by a plurality of feature points D2 presented by frequency-converting the pattern image of the transparent layer 32 is formed in a circular shape T12 (specific positions). The shape represented by the feature points D2 is interpretable as a code.

Figure 5C:
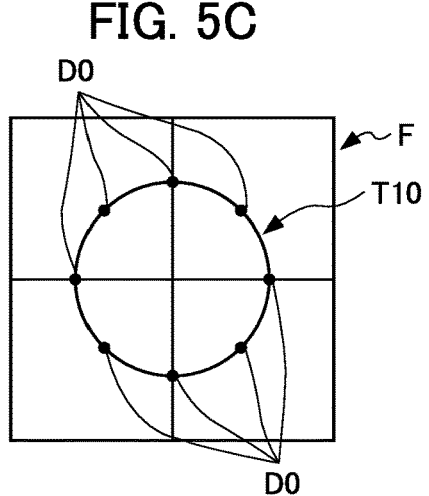

FIG. 5C illustrates a spatial frequency domain F frequency-converted by performing Fourier transformation on a combined image including the pattern image of the lustrous layer 31 and the pattern image of the transparent layer 32. A circular shape T10 represented in the spatial frequency domain F illustrated in FIG. 5C is a circle having the same radius as the circular shape T11 and the circular shape T12. A shape represented by the feature points D0 in the circular shape T10 is the same as the shape represented by the feature points D1 illustrated in FIG. 5A. Accordingly, by only viewing the circular shape T10, the shape represented by the feature points D2 cannot be determined along with the presence or absence thereof. As a result, a code indicated by the shape represented by the feature points D2 disposed in the circular shape T12 cannot be estimated from the spatial frequency domain F.

The circular shapes T11, T12, and T10 illustrated in FIG. 5 are only virtual images and are not actually visible. In Example 2-1, the feature points D2 and the feature point D1 coincide with each other, but this embodiment is not limited thereto. The feature points D1 and the feature points D2 may also not coincide with each other.

EXAMPLE 2-2

Figure 6A:
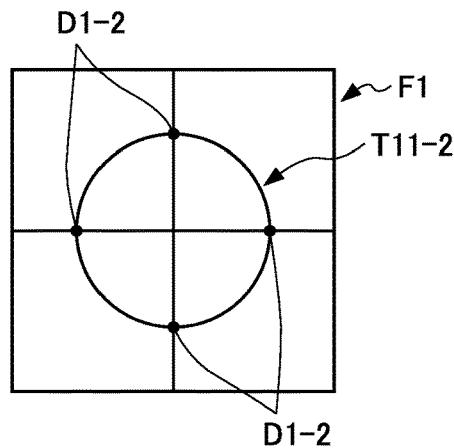
FIG. 6 is a diagram illustrating a spatial frequency domain when a pattern image according to the embodiment is frequency-converted.
Figure 6B:
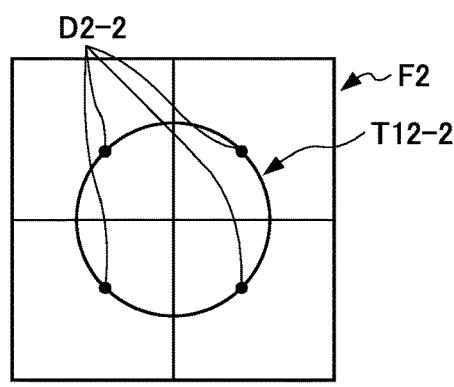

An example in which the feature points do not coincide with each other will be described below. FIG. 6A illustrates a spatial frequency domain F1 frequency-converted by performing Fourier transformation on a certain pattern image of the lustrous layer 31 which is not illustrated. In the spatial frequency domain F1, a shape (a first shape) represented by a plurality of feature points D1-2 presented by frequency-converting the pattern image of the lustrous layer 31 is formed in a circular shape T11-2 (specific positions). FIG. 6B illustrates a spatial frequency domain F2 frequency-converted by performing Fourier transformation on another pattern image of the transparent layer 32 which is not illustrated and different from the pattern image of the lustrous layer 31. Here, an example in which the certain pattern image is the same image as illustrated in FIG. 5B will be described. In the spatial frequency domain F2, a shape (a second shape) represented by a plurality of feature points D2-2 presented by frequency-converting the pattern image of the transparent layer 32 is formed in a circular shape T12-2 (specific positions). The shape represented by the feature points D2-2 is interpretable as a code.

Figure 6C:
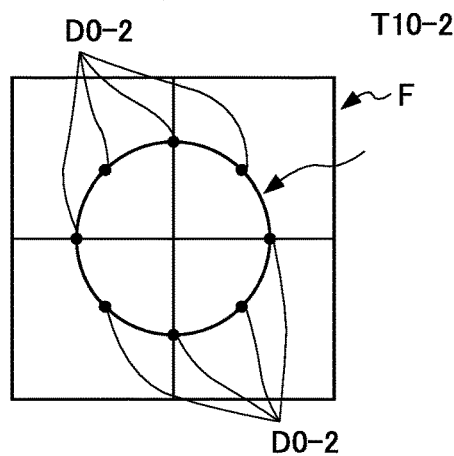

FIG. 6C illustrates a spatial frequency domain F frequency-converted by performing Fourier transformation on a combined image including the pattern image of the lustrous layer 31 and the pattern image of the transparent layer 32. A circular shape T10-2 represented in the spatial frequency domain F illustrated in FIG. 6C is a circle having the same radius as the circular shape T11-2 and the circular shape T12-2. Accordingly, even when the feature points D1-2 and the feature points D2-2 do not coincide with each other, the feature points D1-2 and the feature points D2-2 cannot be determined by only viewing the circular shape T10-2. As a result, a code indicated by the shape represented by the feature points D2-2 disposed in the circular shape T12-2 cannot be estimated from the spatial frequency domain F. The circular shapes T11-2, T12-2, and T10-2 illustrated in FIG. 6 are only virtual images and are not actually visible, similarly to FIG. 5.

EXAMPLE 3

Figure 7A:
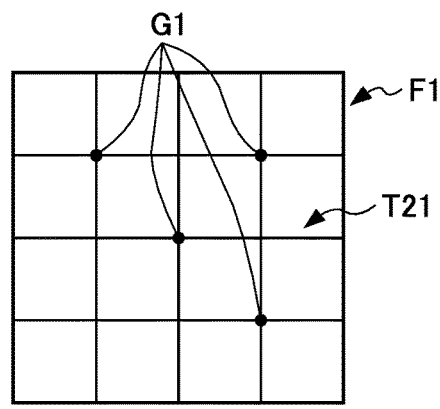
FIG. 7 is a diagram illustrating a spatial frequency domain when a pattern image according to the embodiment is frequency-converted.
Figure 7B:
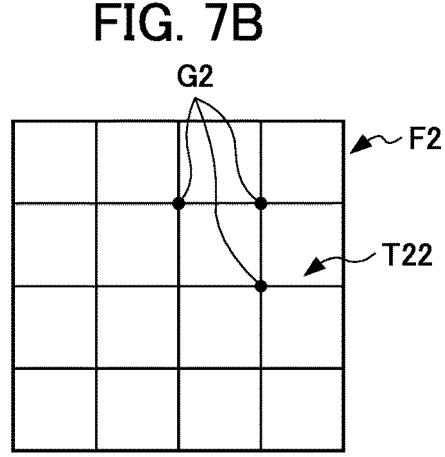

FIG. 7A illustrates a spatial frequency domain F1 frequency-converted by performing Fourier transformation on another pattern image of the lustrous layer 31 which is not illustrated. In the spatial frequency domain F1, a shape (a first shape) represented by a plurality of feature points G1 presented by frequency-converting the pattern image of the lustrous layer 31 is formed in a lattice shape T21 (specific positions). FIG. 7B illustrates a spatial frequency domain F2 frequency-converted by performing Fourier transformation on another pattern image of the transparent layer 32 which is different from the pattern image of the lustrous layer 31 and not illustrated. In the spatial frequency domain F2, a shape (a second shape) represented by a plurality of feature points G2 presented by frequency-converting the pattern image of the transparent layer 32 is formed in a lattice shape T22 (specific positions). The shape represented by the feature points G2 is interpretable as a code.

Figure 7C:
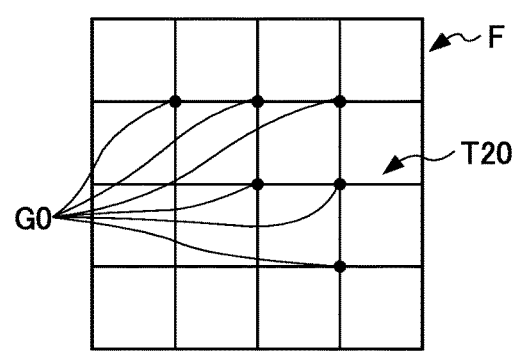

FIG. 7C illustrates a spatial frequency domain F frequency-converted by performing Fourier transformation on a combined image including the pattern image of the lustrous layer 31 and the pattern image of the transparent layer 32. A lattice shape T20 represented in the spatial frequency domain F illustrated in FIG. 7C is the same lattice shape as the lattice shape T21 and the lattice shape T22. In a shape represented by the feature points G0 in the lattice shape T20, the shape represented by the feature points G2 illustrated in FIG. 7B is partially superimposed on the shape represented by the feature points G1 illustrated in FIG. 7A. Accordingly, it cannot be determined which of the shape represented by the feature points G1 and the shape represented by the feature points G2 corresponds to the shape represented by the feature points G0. Accordingly, by only viewing the lattice shape T20, the shape represented by the feature points G2 cannot be determined. As a result, a code indicated by the shape represented by the feature points G2 disposed in the lattice shape T22 cannot be estimated from the spatial frequency domain F.

<Reading Device 5>

Figure 8:
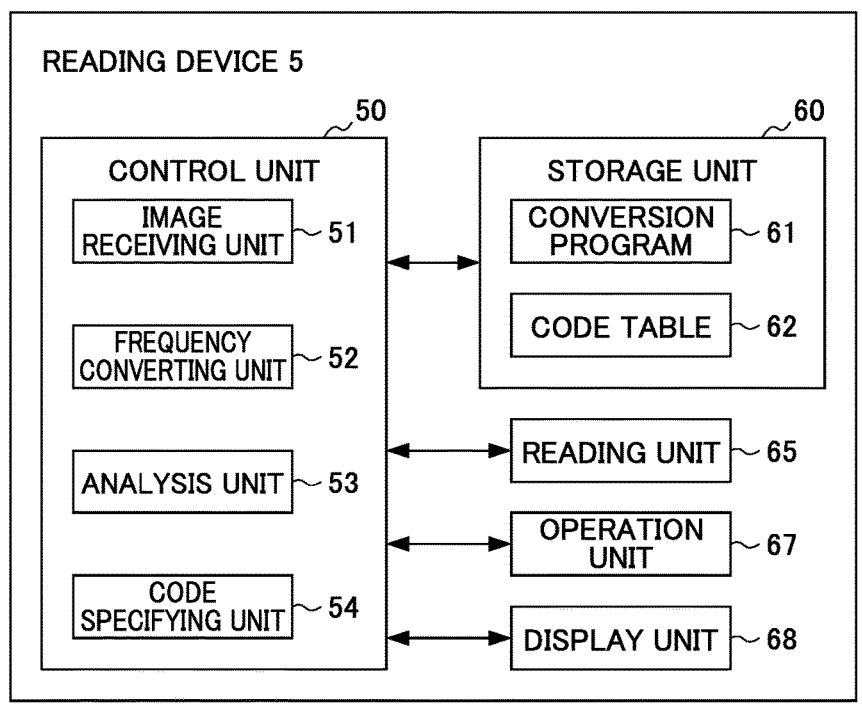
FIG. 8 is a functional block diagram of a reading device according to the embodiment.

A reading device 5 that reads a code from the information recording object 30 of the printed matter 10 will be described below. FIG. 8 is a functional block diagram of the reading device 5 according to this embodiment. The reading device 5 is, for example, a personal computer having a scanner connected thereto. The reading device 5 includes a control unit 50, a storage unit 60, a reading unit 65, an operation unit 67, and a display unit 68. The control unit 50 is a central processing unit (CPU) that controls the reading device 5 as a whole. The control unit 50 implements various functions in cooperation with the above-mentioned hardware by appropriately reading and executing an operating system (OS) or an application program stored in the storage unit 60. The control unit 50 includes an image receiving unit 51, a frequency converting unit 52, an analysis unit 53 (a feature point acquiring unit), and a code specifying unit 54. The image receiving unit 51 receives image data of the information recording object 30 via the reading unit 65 by causing the reading unit 65 to read the information recording object 30. The frequency converting unit 52 performs frequency conversion of decomposing the image data received by the image receiving unit 51 into frequency components and converting the frequency components into the spatial frequency domain F using Fourier transformation. The analysis unit 53 acquires feature points displayed in the spatial frequency domain F. The code specifying unit 54 specifies a code from the feature points acquired by the analysis unit 53 with reference to a code table 62.

The storage unit 60 is a memory area of a hard disk, a semiconductor memory device, or the like for storing programs, data, and the like required for causing the control unit 50 to perform various processes. The computer refers to an information processing device including a control unit and a storage device, and the reading device 5 is an information processing device including the control unit 50 and the storage unit 60 and is included in the concept of the computer. The storage unit 60 stores a conversion program 61 and a code table 62. The conversion program 61 is a program for performing the functions of the control unit 50. The code table 62 is a table in which the arrangement positions of the feature points are correlated with codes. The arrangement positions of the feature points correspond to arrangement positions of the feature points appearing in the spatial frequency domain F2 acquired by frequency-converting a pattern image of the transparent layer 32.

The reading unit 65 is, for example, a scanner and is a unit that reads printing details such as images or characters. The operation unit 67 is, for example, a keyboard or a mouse and is a unit for a user's inputting. The display unit 68 is, for example, a liquid crystal display unit. The operation unit 67 and the display unit 68 may be a unit having both functions such as a touch panel display.

<Process of Reading Device 5>

A process of the reading device 5 will be described below. FIG. 9 is a flowchart illustrating a code specifying process in the reading device 5 according to this embodiment. In Step S (hereinafter simply referred to as "S") 10, the control unit 50 of the reading device 5 starts the reading unit 65. In S11, the control unit 50 (the image receiving unit 51) reads an image using the reading unit 65. Here, a user can allow the reading unit 65 to read an image from an angle at which only a pattern image of the transparent layer 32 of the information recording object 30 can be read. The user can allow the reading unit 65 to read an image from an angle at which only a pattern image of the lustrous layer 31 of the information recording object 30 can be read. The user can allow the reading unit 65 to read an image from an angle at which the pattern images of the lustrous layer 31 and the transparent layer 32 of the information recording object 30 can be read.

In S12, the control unit 50 (the frequency converting unit 52) performs Fourier transformation (the frequency converting process) on the read image. In S13, the control unit 50 (the analysis unit 53) acquires feature points in the spatial frequency domain F. In S14, the control unit 50 (the code specifying unit 54) determines whether a code corresponding to the acquired feature points can be specified with reference to the code table 62. When a code corresponding to the arrangement positions of the acquired feature points is present in the code table 62, the code can be specified. When a code can be specified (YES in S14), the control unit 50 transfers the process to S15. On the other hand, when a code cannot be specified (NO in S14), the control unit 50 transfers the process to S16. In S15, the control unit 50 displays a message on the display unit 68 indicating that a code can be specified. Thereafter, the control unit 50 ends the process.

On the other hand, in S16, the control unit 50 displays an error message on the display unit 68. Thereafter, the control unit 50 ends the process.

When the reading unit 65 reads an image from an angle at which only the pattern image of the transparent layer 32 can be read, the control unit 50 acquires only the pattern image of the transparent layer 32. A code corresponding to the pattern image of the transparent layer 32 is stored in the code table 62. Accordingly, the control unit 50 can specify the code in the process of S14 (YES in S14). On the other hand, when the reading unit 65 reads an image from the angle at which the pattern images of both the transparent layer 32 and the lustrous layer 31 can be read or the reading unit 65 reads an image from the angle at which only the pattern image of the lustrous layer 31 can be read, the control unit 50 does not acquire only the pattern image of the transparent layer 32. Only the codes corresponding to the pattern image of the transparent layer 32 are stored in the code table 62, and codes corresponding to the pattern image of the lustrous layer 31 or the pattern images of both the transparent layer 32 and the lustrous layer 31 are not stored therein. Accordingly, the control unit 50 cannot specify a code corresponding to the acquired feature points in S14 (NO in S14).

<Copied Product 40 of Printed Matter 10>

Figure 10A:
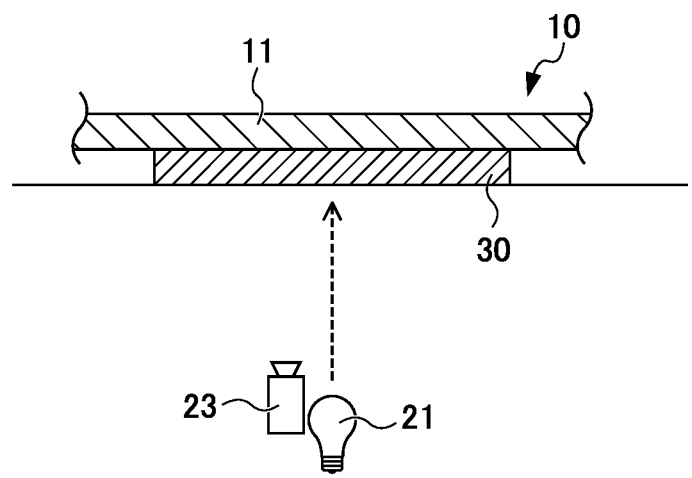
FIG. 10 is a diagram illustrating the positional relationship between an illumination light source and a camera when printed matter according to the embodiment is copied.
Figure 10B:
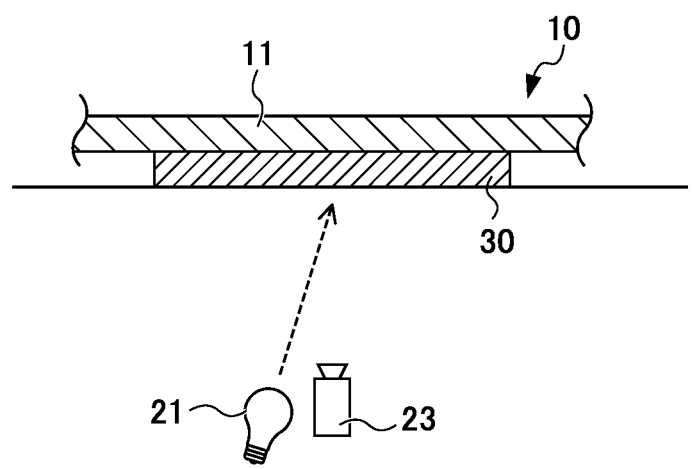

A case in which the printed matter 10 is copied will be described below. FIG. 10 is a diagram illustrating the positional relationship between the illumination light source 21 and the camera 23 when the printed matter 10 according to this embodiment is copied. FIG. 11 is a diagram illustrating a copied product 40 of the printed matter 10 according to this embodiment. FIGS. 10A and 10B illustrate the positional relationship between the illumination light source 21, the camera 23, and the printed matter 10 in a copying machine such as a copier. In the state in which the information recording object 30 of the printed matter 10 is irradiated with light from the illumination light source 21 illustrated in FIG. 10A or 10B, an image thereof is acquired by the camera 23. FIG. 10A illustrates a case in which the illumination light source 21 and the camera 23 are located perpendicular to the information recording object 30 and the camera 23 acquires an image. FIG. 10B illustrates a case in which the illumination light source 21 irradiates the information recording object 30 from a direction slightly inclined thereto and the camera 23 captures an image of the information recording object 30 in the direction perpendicular thereto to acquire an image. In any case, the camera 23 captures images of both the lustrous layer 31 and the transparent layer 32 of the information recording object 30 depending on the positional relationship between the illumination light source 21 and the information recording object 30. In the copying machine, a copied product 40 of the printed matter 10 is produced on the basis of the image acquired by the camera 23 in this way.

Figure 11A:
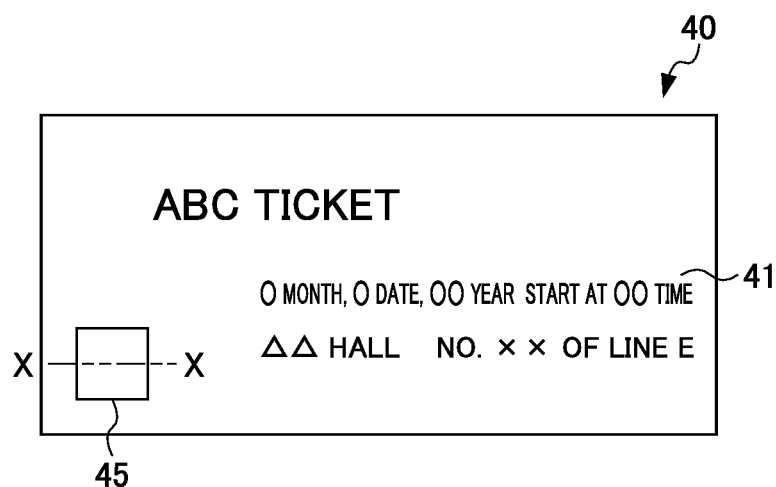
FIG. 11 is a diagram illustrating a copied product of printed matter according to the embodiment.
Figure 11B:
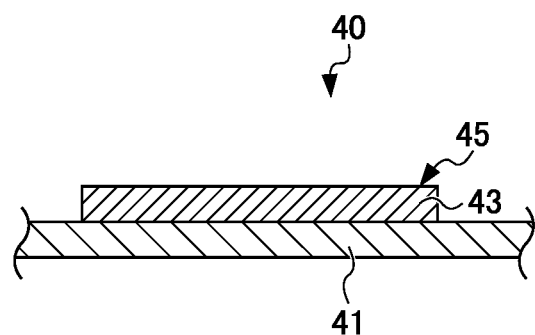

The copied product 40 illustrated in FIG. 11A includes a printed object 45 at a position corresponding to the information recording object 30 of the printed matter 10 (see FIG. 1A). The printed object 45 has a combined image of the pattern image of the lustrous layer 31 and the pattern image of the transparent layer 32 of the information recording object 30. As illustrated in FIG. 11B, the printed object 45 includes an ink layer 43. The ink layer 43 is a layer formed of a black ink including general carbon. Accordingly, even when the printed object 45 is viewed from a viewing angle in any region (such as the extendible reflection region or the regular reflection region), only the combined image is visible.

When the printed object 45 of the copied product 40 is read using the above-mentioned reading device 5, the control unit 50 acquires a combined image of the pattern image of the lustrous layer 31 and the pattern image of the transparent layer 32 of the information recording object 30 without depending on what angle the reading angle of the reading unit 65 is set to. Accordingly, the control unit 50 cannot read a code corresponding to the pattern image of the transparent layer 32 of the information recording object 30 from the printed object 45.

According to the above-mentioned embodiment, the following advantages are obtained.

(1) The information recording object 30 has a combined image of image C1 and image C2. Image C1 and image C2 have a relationship in which regularity of the feature points represented in the spatial frequency domain F2 into which image C2 is frequency-converted is hindered by the feature points represented in the spatial frequency domain F1 into which image C1 is frequency-converted. Accordingly, when both image C1 and image C2 are recognizable, image C2 cannot be estimated from the feature points represented in the spatial frequency domain F into which the combined image of image C1 and image C2 is frequency-converted.

(2) The repetitive shape T1 formed by the feature points represented in the spatial frequency domain F1 into which image C1 on the information recording object 30 is frequency-converted and the repetitive shape T2 formed by the feature points represented in the spatial frequency domain F2 into which image C2 is frequency-converted are similar to each other. Accordingly, when both image C1 and image C2 are recognizable, image C2 cannot be estimated from the feature points represented in the spatial frequency domain F into which the combined image of image C1 and image C2 is frequency-converted.

(3) The feature points represented in the spatial frequency domain F2 into which image C2 of the information recording object 30 is frequency-converted can represent a code. Accordingly, when both image C1 and image C2 printed in the information recording object 30 are recognizable, a code cannot be estimated from the feature points represented in the spatial frequency domain F into which the combined image of image C1 and image C2 is frequency-converted. Particularly, in the copied product 40 of the information recording object 30, since the combined image of image C1 and image C2 can be recognized at any viewing angle, a code cannot be estimated from the copied product 40. Accordingly, the information recording object 30 can be used, for example, for authenticity determination.

(4) Since image C1 is disposed in the lustrous layer 31 and image C2 is disposed in the transparent layer 32, image C1 and image C2 can be switched and viewed depending on the viewing angle of the information recording object 30. Since the lustrous layer 31 can be formed of a lustrous ink including a lustrous material and the transparent layer 32 can be formed of a transparent ink, printing to be switched can be carried out at a low cost.

(5) By causing the reading device 5 to read the information recording object 30 at the viewing angle at which only image C2 is visible, the reading device 5 can read a code indicating the feature points represented in the spatial frequency domain F2 into which image C2 is frequency-converted. When the reading device 5 reads the printed object 45 of the copied product 40 from which only the combined image of image C1 and image C2 is visible, the feature points represented in the spatial frequency domain F into which the combined image is frequency-converted are read and thus a code cannot be read from the read feature points.

While an embodiment of the invention has been described above, the invention is not limited to the embodiment. The advantages described in the embodiment are only the most suitable advantages which can be obtained in the invention listed and the advantages of the invention are not limited to those described in the embodiment. The above-mentioned embodiment and modifications to be described later may be appropriately combined for use and a detailed description thereof will not be made.

(Modifications)

Figure 12A:
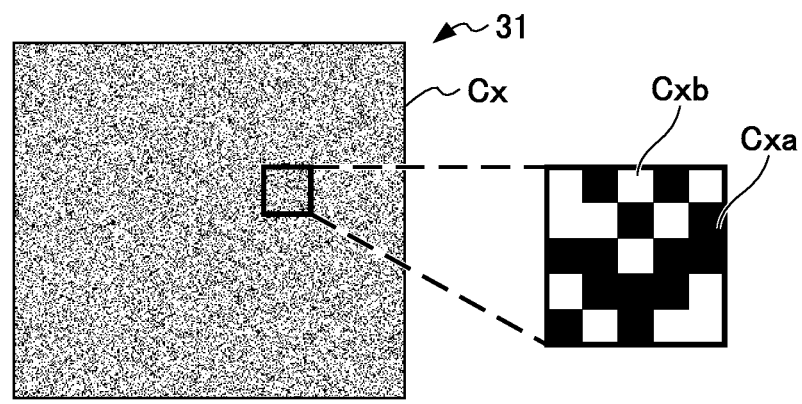
FIG. 12 is a diagram illustrating an example of a pattern image of an information recording object according to a modification.
Figure 12B:
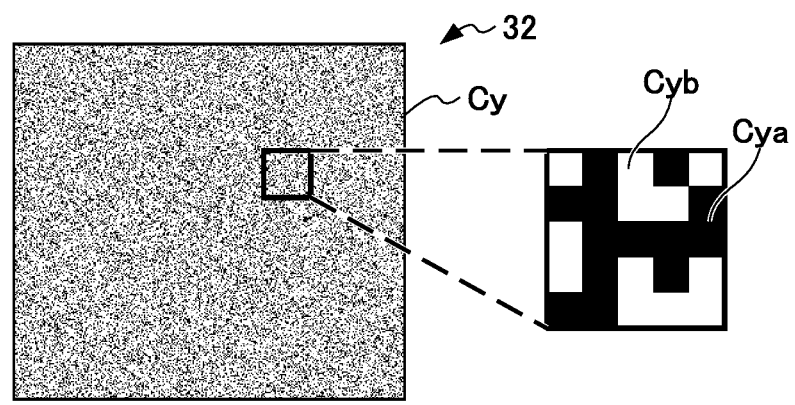

(1) In the embodiment, pattern images including a foreground portion and a background portion are printed in the lustrous layer 31 and the transparent layer 32 of the information recording object 30. However, the invention is not limited thereto. For example, as illustrated in FIG. 12, image Cx of the lustrous layer 31 and image Cy of the transparent layer 32 may be pattern images including only a foreground portion. In this case, printing regions Cxa and Cya of image Cx and image Cy are printed with a halftone area ratio of 100% and the pattern images are represented in two values using printing regions Cxa and Cya and non-printing regions, which are not printed, Cxb and Cyb.

(2) In the embodiment, as an example, the shape represented by the feature points in the spatial frequency domain F1 into which the pattern image of the lustrous layer 31 of the information recording object 30 is frequency-converted and the shape represented by the feature points in the spatial frequency domain F2 into which the pattern image of the transparent layer 32 is frequency-converted are repetitive shapes of circles, but the invention is not limited thereto. For example, a polygonal repetitive shape or a linear repetitive shape may be used.

(3) In the embodiment, as an example, the feature points in the spatial frequency domain F1 into which the pattern image of the lustrous layer 31 of the information recording object 30 is frequency-converted and the feature points in the spatial frequency domain F2 into which the pattern image of the transparent layer 32 is frequency-converted are images expressed as a circular shape or a lattice shape, but the invention is not limited thereto. For example, the feature points may be an image expressed as a linear shape.

(4) In the embodiment, the information recording object 30 including the lustrous layer 31 and the transparent layer 32 is described as an example. However, the invention is not limited thereto. The pattern images may not be printed in the layers as long as they are formed of a lustrous material and a transparent material. A pattern image in which a code is embedded may be printed with a color element having high brightness and a pattern image which hinders the code may be printed with a color element having low brightness.

(5) In the embodiment, a ticket is exemplified as an example of the printed matter 10 including the information recording object 30, but the invention is not limited thereto. Examples of the printed matter include cards which are used in games and security labels.

(6) In the embodiment, a personal computer is described as an example of the reading device 5, but the invention is not limited thereto. Another example of the reading device is a portable terminal such as a smartphone having a camera. In this case, an image read by the camera can be processed.

EXPLANATION OF REFERENCE NUMERALS

5 reading device
10 printed matter 21 illumination light source
23 camera
30 information recording object
31 lustrous layer
32 transparent layer
40 copied product
43 ink layer
45 printed object
50 control unit
51 image receiving unit
52 frequency converting unit
53 analysis unit
54 code specifying unit
60 storage unit
62 code table
65 reading unit
C1, C2, Cx, Cy pattern image
C1a, C2a foreground portion
C1b, C2b background portion
D0, D1, D2, D0-2, D1-2, D2-2 feature point
F, F1, F2 spatial frequency domain
G0, G1, G2 feature point
T0, T1, T2 repetitive shape
T10, T11, T12, T10-2, T11-2, T12-2 circular shape
T20, T21, T22 lattice shape

The invention claimed is:

1. An information recording object having a combined image including a first image and a second image formed on the first image, wherein
the first image and the second image are printed with inks having different reflected light intensities depending on a viewing angle,
one image of the combined image is recognizable by way of an external device depending on the viewing angle and is an insignificant image when only glanced at by a person,
the second image is an image having regularity in feature points in a spatial frequency domain, and
the first image is an image in which at least one feature point in the spatial frequency domain is disposed at a position hindering the regularity.

2. The information recording object according to claim 1, wherein
a first shape which is represented by the feature points in the spatial frequency domain of the first image and a second shape which is represented by the feature points in the spatial frequency domain of the second image are identical or similar to each other.

3. The information recording object according to claim 2, wherein
the first shape and the second shape are repetitive shapes.

4. The information recording object according to claim 1, wherein
the first image and the second image are images in which the feature points in the spatial frequency domain appear at specific positions.

5. The information recording object according to claim 4, wherein
the feature points in the spatial frequency domain of the second image are disposed on at least one of the feature points in the spatial frequency domain of the first image and points on a line connecting neighbor points of the feature points.

6. The information recording object according to claim 1, wherein
the feature points in the spatial frequency domain of the second image correspond to a code.

7. The information recording object according to claim 1, wherein
the first image is formed of a color element having low brightness, and
the second image is disposed on a viewing side of the first image and is formed of a color element having higher brightness than that of the first image.

8. The information recording object according to claim 7, wherein
the first image is formed of a lustrous material, and
the second image is formed of a transparent material.

9. A reading device comprising:
a reading unit configured to read an image of the information recording object according to claim 1;
a frequency converting unit configured to decompose the image read by the reading unit into frequency components and to convert the frequency components into a spatial frequency domain; and
a feature point acquiring unit configured to acquire feature points in the spatial frequency domain converted by the frequency converting unit.

* * * * *